Feb. 2, 1971   K. A. WILSON   3,560,922
SELF-PROPELLED VEHICLE WITH SAFETY BUMPER
Filed Nov. 2, 1967
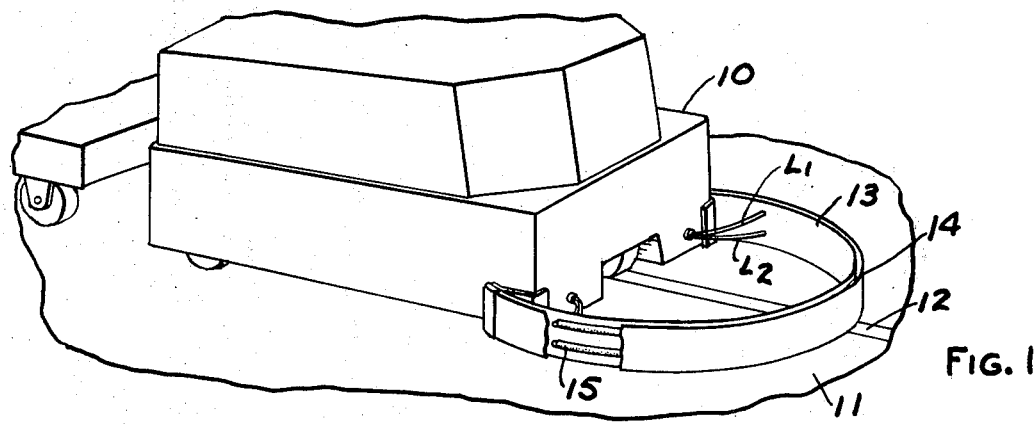
FIG. 1
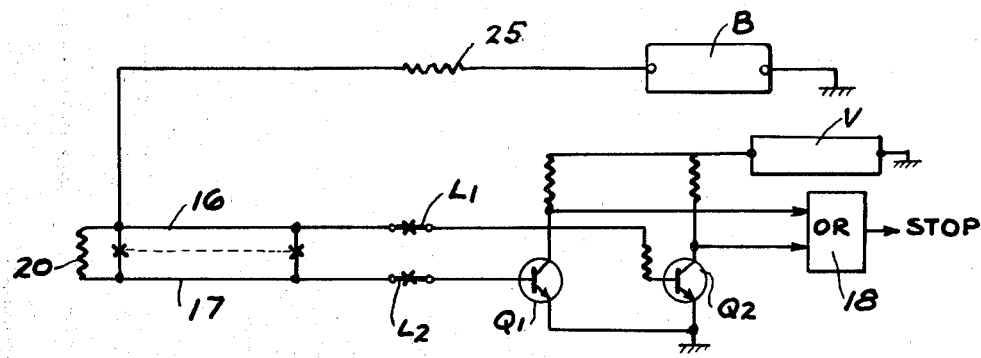
FIG. 2
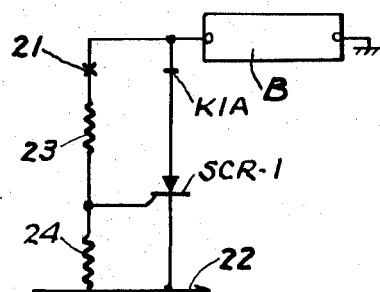
FIG. 4
| | Q1 | Q2 | | |
|---|---|---|---|---|
| STATE 1 | 0 | 0 | NORMAL | GO |
| STATE 2 | 0 | 1 | LEAD 1 OFF | STOP |
| STATE 3 | 1 | 0 | LEAD 2 OFF | STOP |
| STATE 4 | 0 | 1 | SWITCH CLOSED | STOP |
FIG. 3
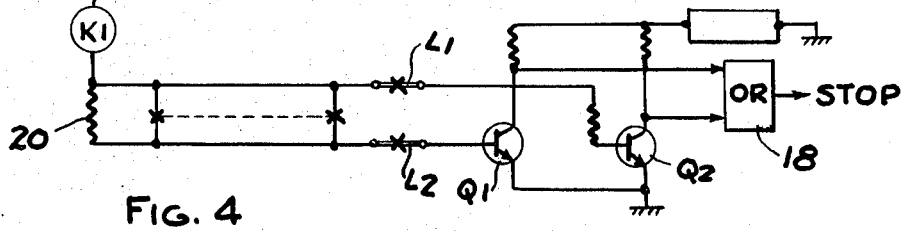
INVENTOR.
KENNETH A. WILSON
BY
Barnes, Kisselle, Raisch & Choate
ATTORNEYS

United States Patent Office 3,560,922
Patented Feb. 2, 1971

3,560,922
SELF-PROPELLED VEHICLE WITH SAFETY BUMPER
Kenneth A. Wilson, Locust Valley, N.Y., assignor, by mesne assignments, to American Chain & Cable Company, Inc., New York, N.Y., a corporation of New York
Filed Nov. 2, 1967, Ser. No. 680,129
Int. Cl. B60q 9/00
U.S. Cl. 340—61                                                         7 Claims

ABSTRACT OF THE DISCLOSURE

The self-propelled vehicle disclosed herein comprises a safety bumper including spaced flexible sheet members with a switch interposed therebetween whereby when an obstacle is encountered, the outermost bumper is moved toward the innermost bumper to close said switch and produce a stop signal. Means are provided so that in the event of closure of the switch or breaking of any of the leads to the switch, a stop signal is produced.

---

This invention relates to self-propelled vehicles and particularly to self-propelled vehicles having safety bumpers.

BACKGROUND OF THE INVENTION

In self-propelled vehicles that follow a predetermined path such as an embedded wire on the ground, since no operator is provided on the vehicle, it is essential that provisions be made for stopping the vehicle if the vehicle encounters an obstacle. It has heretofore been suggested that a safety switch be closed upon engagement of the bumper of the vehicle with an obstacle.

Among the objects of the invention are to provide means associated with the safety switch to produce a stop signal in the event that the leads are broken, disconnected or left unconnected after servicing the vehicle.

It is a further object of the invention to provide such an apparatus which is simple, relatively inexpensive and fail safe.

DESCRIPTION OF THE DRAWINGS

FIG. 1 is a part sectional perspective view of a vehicle embodying the invention.

FIG. 2 is a schematic wiring diagram of the vehicle shown in FIG. 1.

FIG. 3 is a chart of the electrical conditions of the circuit shown in FIG. 2.

FIG. 4 is a schematic wiring diagram of a modified form of the invention.

DESCRIPTION

Referring to FIG. 1, the vehicle 10 is adapted to be moved along a floor 11 and follow a wire embedded in a slot 12 in the floor. The vehicle includes sensing coils (not shown) that sense the position of the wire to guide the vehicle.

A safety bumper in the form of flexible metal sheets 13, 14 is supported on the front of the vehicle and continuous strip switches 15 are provided between the sheet members 13, 14 on sheet member 13 so that when the outer bumper 14 is deflected by engagement with an obstacle, it engages the switches 15 to close the switches and complete a circuit to produce a stop signal to stop the vehicle. As shown in FIG. 1, leads $L_1$, $L_2$ extend from the contacts of the switch to the vehicle.

Means are provided for producing a stop signal when the switch 15 is actuated or when the leads $L_1$, $L_2$ are broken or left disconnected. Specifically, as shown in FIG. 2, a source of voltage from a battery B is applied through a current limiting resistor 25 to contact 16 of switch B. Leads $L_1$, $L_2$ connect contacts 16, 17 to circuitry within the vehicle which comprises transistors $Q_1$ $Q_2$. More specifically, the base of each transistor $Q_1$, $Q_2$ is connected to the respective lead $L_2$, $L_1$, $Q_2$ being connected through a current limiting resistor to lead $L_1$, the emitters are connected to ground and the collectors are connected to a source of voltage V through appropriate resistors. The collectors of the transistors are also connected to an "or" gate 18. Resistor 20 is connected across the bumper switch and provides a path for base current, through lead $L_1$, to the base of transistor $Q_1$.

Normally, when the contacts 16, 17 are out of contact with one another, that is, when the bumper has not been actuated, and when the leads $L_1$, $L_2$ are connected as intended, the transistors $Q_1$, $Q_2$ will conduct. In the event that the contacts 16, 17 are engaged or one of the leads $L_1$, $L_2$ is broken or left unconnected, one of the transistors will not conduct so that the potential applied to the collectors thereof will be supplied to the "or" gate producing a digital signal for stopping the vehicle.

The various conditions and states are summarized in the table shown in FIG. 3.

In the form of the invention shown in FIG. 4, a secondary protective circuit is provided in association with the principal protective circuit and comprises a relay K1 which is connected to the main power source B through a silicon-controlled rectifier SCR–1 and a normally closed contact K1A of relay K1. A start switch 21 is connected to the gate lead of silicon-controlled rectifier SCR–1 in association with suitable resistors 23, 24 and is adapted to supply current when the switch 21 is momentarily closed to fire silicon-controlled rectifier SCR–1. When the silicon-controlled rectifier SCR–1 is fired, power is supplied through line 22 to a plurality of control relays for performing various functions on the vehicle such as controlling the drive motor operation and the brake.

Resistor 20 has a high resistance so that normally insufficient current flows through the relay to energize the relay. However, in the event that the bumper is actuated, relay K1 is activated in addition to the condition mentioned heretofore represented by State 4 in FIG. 3. When relay K1 is activated, the current through silicon-controlled rectifier SCR–1 is momentarily interrupted thereby removing the voltage in line 22 to all control relays. Silicon-controlled rectifier SCR–1 remains off until the start switch is again pushed to fire the rectifier. Thus, the circuit shown in FIG. 4 provides an additional safety control by inactivating the control relays.

What is claimed is:

1. In a self-propelled vehicle having a safety bumper including a safety bumper switch actuated upon engagement with an obstacle to produce a signal, the combination comprising
   electrical leads extending to the contacts of said switch,
   and means responsive to the closure of said switch or the breaking of said leads to produce a signal.

2. The combination set forth in claim 1 wherein said last-mentioned means comprises a resistor across said contacts of said switch,
   a pair of transistors,
   the base of one said transistor being connected to said one lead,
   the base of the other said transistor being connected to another said lead,
   and "or" gate,
   the collectors of said transistors being connected to said "or" gate whereby when the voltage applied to the base of said transistors is interrupted, a signal is produced to said "or" gate causing said gate to fire and produce a stop signal.

3. The combination set forth in claim 2 including a source of voltage connected to the contacts of said switch.

4. The combination set forth in claim 3 including a second source of voltage applied to the collectors of said transistors.

5. The combination set forth in claim 1 including a master relay having a coil interposed between the power source and said contacts, said relay being in series with the power source and said contacts, said relay having a normally closed contact in series with the power source and the coil, a resistor having a high resistance in series with said coil of said relay, a silicon control rectifier in series with said normally closed contact, and a plurality of control relays connected to the power source through said rectifier, the resistance of said resistor being such that normally insufficient current flows therethrough to energize said coil but upon closure of said switches or breaking of said leads, said resistor is bypassed and said coil is energized to interrupt the voltage applied to said rectifier and thereby inactivate said rectifier and interrupt the application of voltage to said control relays.

6. For use in a self-propelled vehicle having a safety bumper including a safety bumper switch actuated upon engagement with an obstacle to produce a signal, the combination comprising electrical leads adapted to be connected to the contacts of said switch, and means responsive to the closure of said switch or the breaking of said leads to produce a signal comprising a resistor across said contacts of said switch, a pair of transistors, the base of one said transistor being connected to one said lead, the base of the other said transistor being connected to another said lead, and "or" gate, the collectors of said transistors being connected to said "or" gate, a source of voltage connected to the contacts of said switch, a second source of voltage applied to the connectors of said transistors whereby when the voltage applied to the base of said transistors is interrupted, a signal is produced to said "or" gate causing said gate to fire and produce a stop signal.

7. The combination set forth in claim 6 including a master relay having a coil interposed between the power source and said contacts,, said relay being in series with the power source and said contacts, said relay having a normally closed contact in series with the power source and the coil, a resistor having a high resistance in series with said coil of said relay, a silicon control rectifier in series with said normally closed contact, and a plurality of control relays connected to the power source through said rectifier, the resistance of said resistor being such that normally insufficient current flows therethrough to energize said coil but upon closure of said switches or breaking of said leads, said resistor is bypassed and said coil is energized to interrupt the voltage applied to said rectified and thereby inactivate said rectifier and interrupt the application of voltage to said control relays.

References Cited
UNITED STATES PATENTS

| | | | |
|---|---|---|---|
| 1,682,731 | 9/1928 | Austin | 180—96 |
| 1,751,186 | 3/1930 | Adam | 180—96 |
| 2,232,726 | 2/1941 | Perez | 180—96 |

DONALD J. YUSKO, Primary Examiner

H. S. COHEN, Assistant Examiner

U.S. Cl. X.R.

180—96, 116